United States Patent [19]

Greider et al.

[11] Patent Number: 4,704,847
[45] Date of Patent: Nov. 10, 1987

[54] CONTROL MECHANISM FOR WALK-BEHIND MOWER

[75] Inventors: C. Austin Greider, Des Moines; Timothy E. Berry, Johnston, both of Iowa

[73] Assignee: Western International, Inc., Des Moines, Iowa

[21] Appl. No.: 806,531

[22] Filed: Dec. 9, 1985

[51] Int. Cl.$^4$ .................... A01D 34/82; A01D 34/67
[52] U.S. Cl. ........................ 56/10.5; 56/11.3
[58] Field of Search ............ 56/11.3, 11.8, 11.9, 56/10.5; 192/0.094, 0.096

[56] References Cited

U.S. PATENT DOCUMENTS

| | | | |
|---|---|---|---|
| 4,212,141 | 7/1980 | Miyazawa et al. | 56/11.3 |
| 4,221,108 | 9/1980 | Owens | 56/11.3 |
| 4,316,355 | 2/1982 | Wolf | 56/11.3 |
| 4,382,228 | 10/1982 | Plamper et al. | 56/11.3 |
| 4,413,466 | 11/1983 | Beugelsdyk et al. | 56/11.3 |
| 4,433,530 | 2/1984 | Schaefer | 56/10.5 |
| 4,455,811 | 6/1984 | Beugelsdyk | 56/11.8 |
| 4,531,347 | 7/1985 | Schutz | 56/10.5 |

Primary Examiner—Paul J. Hirsch
Attorney, Agent, or Firm—G. Brian Pingel; Kent A. Herink

[57] ABSTRACT

A control assembly associated with a walk-behind mower having a handle bar that is attached to a rear portion of the mower body and is formed with opposite side portions and a rear cross portion extending between the side portions. Forming the control assembly, are two curved bale members juxtaposed in a side-to-side relationship with one another and pivotally connected between the side portions of the mower handle bar. A first control cable connects one of the pivotable bale members with an operator zone engine kill/restart assembly and a second control cable connects the other bale member with the wheel clutch so that these assemblies can be independently actuated by consecutive movement of the bale members to actuating positions. In a first preferred embodiment, each of the bale members includes a transverse portion conforming to the peripheral shape of the cross portion of the handle bar whereby the handle bar cross portion is received in the bale transverse portion when the bale is in an actuating position to operatively form a unitary member therewith.

4 Claims, 4 Drawing Figures

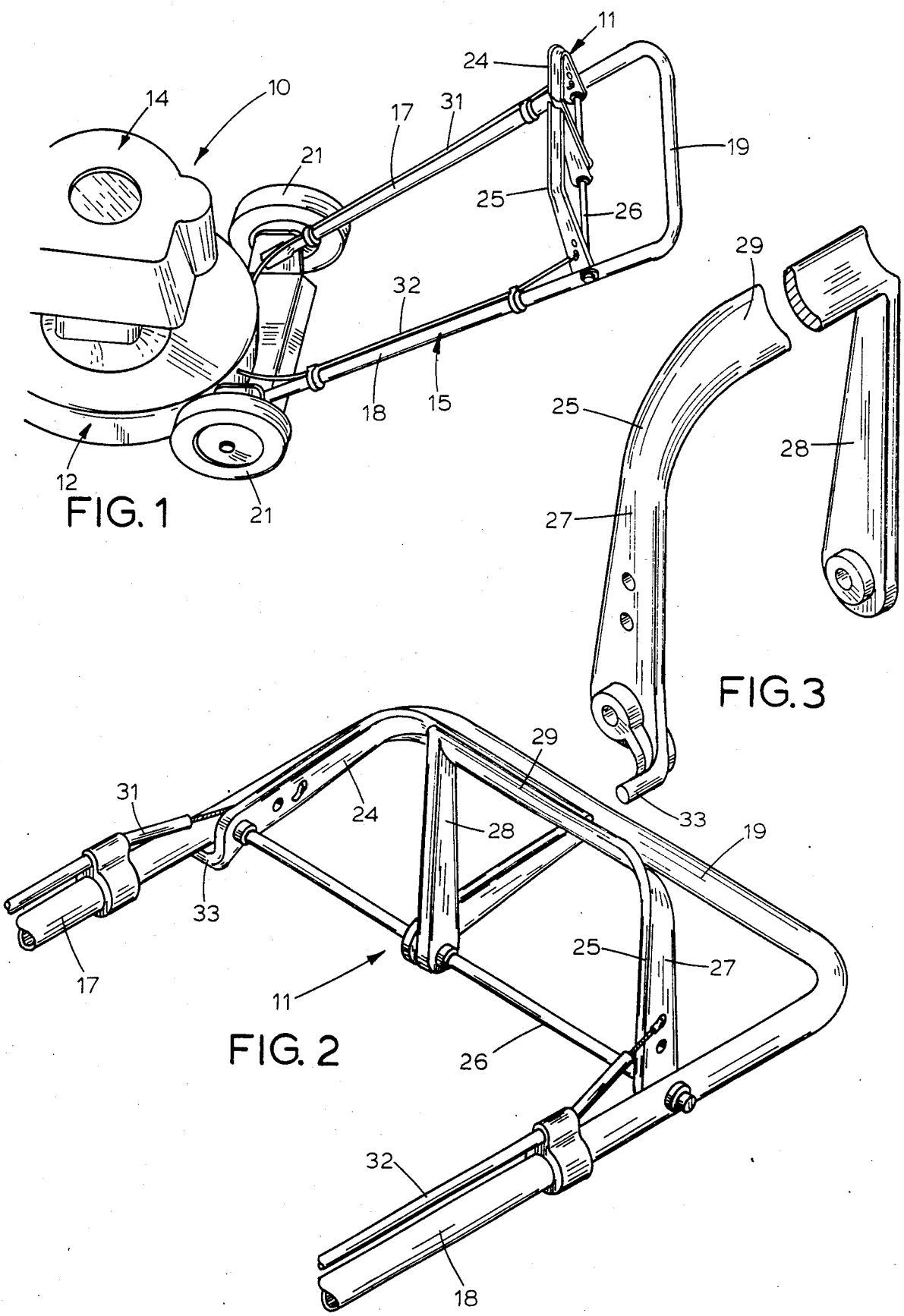

CONTROL MECHANISM FOR WALK-BEHIND MOWER

BACKGROUND OF THE INVENTION

1. Field of the Invention

The present invention relates in general to control mechanisms for walk-behind mowers and more specifically relates to double actuating control mechanisms for such mowers to comply with federal safety standards.

2. Description of the Prior Art

Numerous safety standards have recently been federally enacted for the protection and safety of operators using walk-behind mowers. The primary purposes behind these regulations are to prevent the engine of the lawn mower from operating if the user of the mower is not in a proper operator's position to prevent rocks and other debris from being thrown by the mower against the operator's body, and to make it difficult, if not impossible, for the operator to come in contact with the cutting blades of the mower while they are in motion.

To achieve the above purposes in connection with power driven walk-behind mowers, federal regulations require separate means for actuating the engine kill/restart control and the wheel clutch. To meet these requirements, a control system that has been used almost industry-wide was developed. This control system utilizes a single-control bale associated with the handle bar of a mower and a trigger mechanism releasable by the bale. In operation, the control system is designed so that when the bale is in a forward (neutral) position with respect to the end of the mower handle bar, the engine kill/restart control and wheel clutch are disengaged. Upon movement of the bale to its rearwardly most position, the engine restart is engaged to permit the engine to be started. Once the engine is started, the trigger mechanism is then manually cocked by the user to engage the drive clutch and the mower is then in normal operation. Disengagement of the engine kill/restart and drive clutch occur as the bale is returned to its neutral position. However, disengagement of both does not occur simultaneously. Instead, as the bale is partially returned to the neutral position, first the drive clutch is disengaged to stop the self-propelled action of the mower. As the bale reaches its neutral position, the engine is then killed by release of the engine kill/restart. In this way, it is possible for a user to stop the self-propelled action of the mower without killing the engine in instances when it is necessary to turn the mower around or prevent it from hitting objects, etc.

Although the above type of control system is used almost industry-wide, it has a major deficiency making it difficult to properly control the mower because it is difficult for a user to discern the proper forward movement of the control bale to disengage the self-propelled drive but yet not turn the mower off. Thus, users must pay careful attention to the degree of bale travel while they are using a mower with such a control mechanism.

The present invention provides an improved mower control assembly with independently actuated bale members for separately controlling engagement of the engine kill/restart and engagement of the drive clutch.

SUMMARY OF THE INVENTION

The present invention provides a dual function manual control assembly for actuating two independently controlled mechanisms of a power driven lawnmower having a handle bar attached to a rear portion of the mower body. The control assembly includes a first bale member pivotally associated with one side of the handle bar, a second bale member pivotally associated with the opposite side of the handle bar, and connecting means for pivotally connecting the opposite ends of each of the two bale members in association with the handle bar. The bale members are connected to the handle bar in such fashion that either of the bale members is independently pivotable from a normal nonactuating position to an actuating position in which the bale members lie adjacent the handle bar. The control assembly further includes means for connecting the bale members to their respective controlled mechanisms so that one of the mechanisms is actuated by pivotal movement of the first bale member and the other of the two mechanisms is actuated by pivotal movement of the second bale member.

In the preferred embodiment of the invention, each of the bale members includes a transverse portion conforming to the peripheral shape of the cross portion of the handle bars. Thus, the handle bar cross portion is receivable in such transverse portion when the bales are in their actuating positions whereby the handle bars and bale operatively form a unitary member.

It is an object of the present invention to provide a control assembly that can be easily and effectively operated to properly control a self-propelled lawn mower. A further object of the present invention is to provide a control assembly that is relatively simplistic in construction but yet will meet all requirements of the existing federal regulations. Other objects and advantages of the present invention will become apparent from the following more detailed description when taken in conjunction with the attached drawings in which all similar elements are like numbered.

BRIEF DESCRIPTION OF THE DRAWINGS

FIG. 1 is a rear side partial perspective view of a walk-behind mower on which a first preferred embodiment of the control assembly of the present invention is employed;

FIG. 2 is an enlarged perspective view of the handle bar and control assembly of FIG. 1, which assembly is shown in a partially actuated condition;

FIG. 3 is a perspective view of a bale member forming a portion of the control assembly in FIG. 1.

DESCRIPTION OF THE PREFERRED EMBODIMENTS

Figure 4:
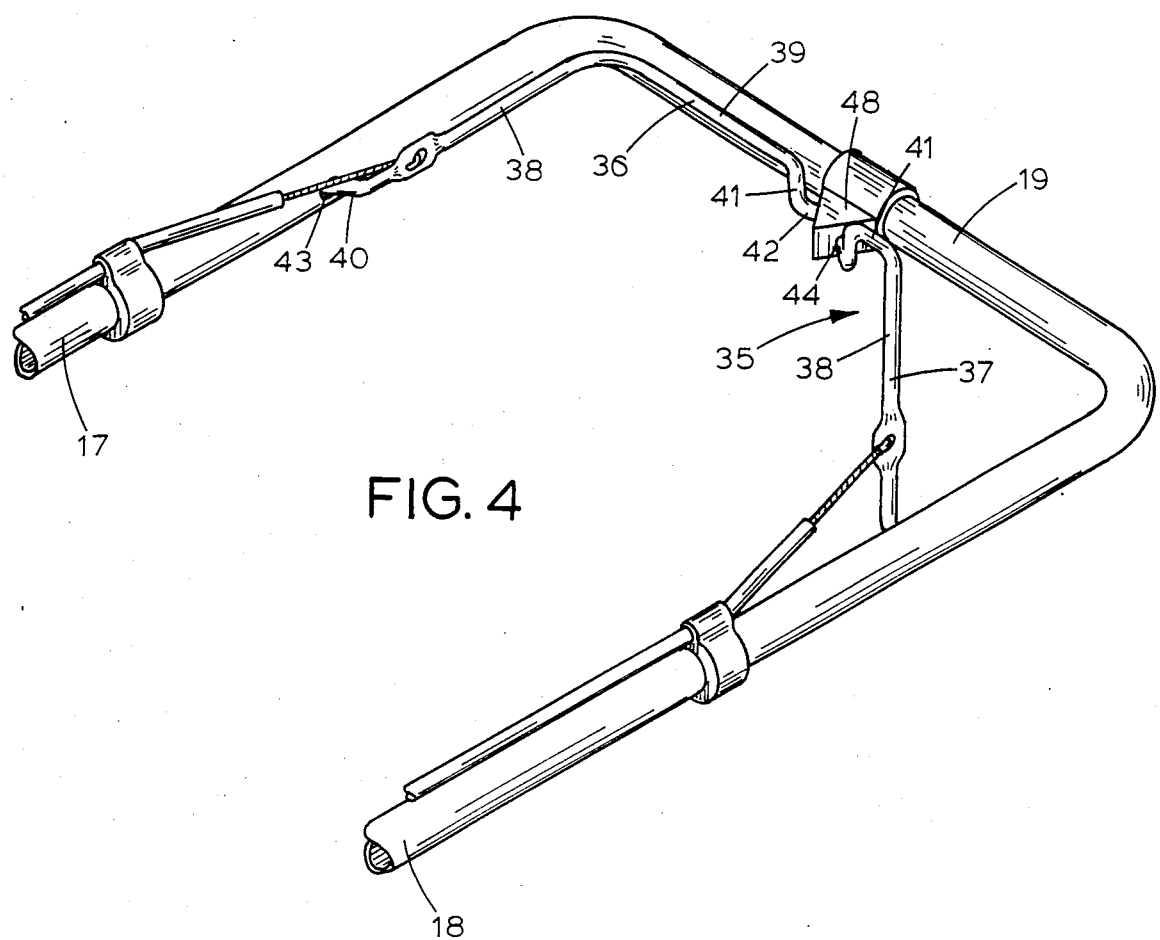
FIG. 4 is a perspective view of a second preferred embodiment of the control assembly of the present invention mounted on a mower handle bar.

Referring now to the drawings and with reference first to FIG. 1, a typical walk-behind self-propelled lawn mower is partially shown generally at 10. The only difference between the mower 10 and power mowers presently being used is that the mower 10 includes a first preferred embodiment of a dual bale mower control assembly of the present invention shown generally at 11.

The mower 10 includes a blade housing 12 for a rotary cutting blade (not shown) driven by the conventional gasoline engine 14. Steering of the mower 10 is accomplished by a handle bar 15 that is attached to the rear of the mower body to extend upwardly and rearwardly therefrom. Preferably, the handle bar 15 is formed from two tubular opposite side portions 17 and 18 and a tubular cross portion 19 that extends between and connects the rear ends of the side portions 17 and 18.

The engine 14 is adapted through drive trains and clutch mechanisms (not shown) to serve as the power source for both the mower blade and drive wheels of the mower 10, which drive wheels may either be the front wheels (not shown) or rear wheels 21 of the mower 10.

The control assembly 11 is adapted for mounting from the handle bar 15 to provide for independent actuation of the engine 14 and the drive clutches. The control assembly 11 includes a pair of bale members 24 and 25 that are a mirror image of one another and are journaled on an axle 26 extending between the side portions 17 and 18 of the handle bar 15. The bale members 24 and 25 are generally of a U-shaped configuration (as shown in FIG. 2) and each include a partially curved side 27 adjacent one of the handle bar portions 17 or 18, a straight side portion 28 and a transverse rear side 29, all of which sides 27, 28, and 29 form the bale members 24 and 25 in unitary fashion.

As shown best in FIG. 3, the bale member rear side 29 is arcuately-shaped to conform to the tubular configuration of the handle bar cross portion 19. Thus, the cross portion 19 is receivable in the arcuate rear bale side 29 of either of the bale members 24 or 25 when they are moved to their fullest rear position as indicated by bale 24 in FIG. 2.

The bale members 24 and 25 are preferably spring biased in their forward most position by spring assemblies (not shown) associated with cable control means 31 and 32, as are well known in the art, attached respectively to bale members 24 and 25. As indicated by FIGS. 1 and 2, the cable assemblies 31 and 32 are connectable respectively to the bales 24 and 25 by means of two vertically spaced apart appertures in the sides 27, and the particular apperture utilized is dependent upon the amount of stroke desired for the bales 24 and 25. Preferably, the bale member 24 is associated with the operator zone engine kill/restart and the bale member 25 is associated with the drive clutch. Consequently, to start the engine 14 requires the bale member 24 to be pivoted from its forward most neutral position to its rearward most (actuating) position in which the bale member rear side 29 is adjacent the handle bar cross portion 19. It should be noted, that the bale members 24 and 25 each include a limit of movement abutment prong 33 extending outwardly from the free end of the bale member curved side 27 in orthogonal fashion thereto to ensure that the bale members cannot be pivoted beyond their engagement with the handle bar cross section 19.

Once the engine 14 has begun running, engagement of the drive wheels of the mower 10 is simply accomplished by moving the bale member 25 to its rearward most (actuating) position. This places the mower 10 in its self-propelled mode and normal cutting operation is initiated. It should be easily recognized, that if it is desired to stop the self-propelled action of the mower 10, all that is required is release of the bale member 25 by the user to permit such bale member to return to its forward most (neutral) position thereby deactuating the drive clutch.

Referring now to FIG. 4, a second preferred embodiment of the control assembly of the present invention is shown generally at 35. The operating principle of the assembly 35 is identical to that of the assembly 11. The only differences between the assemblies 11 and 35 is that the assembly 35 has bale members 36 and 37 that are of a different shape than the bale members 24 and 25 and are connected in a different fashion to the handle bar 15. Similar to the bale members 24 and 25, the bale members 36 and 37 are a mirror image of one another and include a tubular-shaped side 38 adjacent one of the handle bar side portions 17 or 18 and a tubular-shaped rear side portion 39. However, the bale members 36 and 37 differ from the bale members 24 and 25 by having the side 38 terminating in a prong 40 and a curved truncated side portion 41 that extends only a short distance out from the rear side 39 and has a pronged end 42.

The bale members 36 and 37 are pivotally connected to the handle bar 15 by means of the prongs 40 and 42 on the ends of the sides 38 and 41. The prongs 40 and 42 extend into corresponding apertures 43 and 44 in the handle bar side portions 17 and 18 and a connecting means 48 to serve as axles for the bale sides 38 and 41. The connecting means 42 is attached to the medial portion of the handle bar cross portion 19 to pivotally connect the truncated sides 40 of the bale members 36 and 37 to such cross portion.

Thus, the present invention provides a dual bale mower control assembly that is relatively simplistic in construction and operation but yet fully and effectively meets all federal regulations for providing dual control of the starting and driving functions of a self-propelled walk-behind mower. Not only is the control assembly of the present invention easy for a user to become familiar with, but moreover, the control assembly can thereafter be used for operating the mower 10 in almost troublefree fashion.

We claim:

1. A dual function manual control assembly for actuating two independently controlled mechanisms of a power driven lawn mower having a handle bar that is attached to a rear portion of the mower body and is formed with opposite side portions and a rear cross portion extending between said side portions, said assembly comprised of:
    (a) a first bale member having one end pivotally associated with one of said opposite side portions and an opposite distal end;
    (b) a second bale member having one end pivotally associated with the other of said opposite side portions and an opposite distal end adjacent to the distal end of the first bale member;
    (c) means for pivotally connecting said opposite distal ends of said bale members in association with said handle bar in such fashion that either of said bale members is independently pivotable from a normal nonactuating position to an actuating position in which said bale member lies adjacent said handle bar;
    (d) means connected to said first and second bale members and said controlled mechanisms so that one of said mechanisms is actuated by pivotal movement of said first bale member and the other of said mechanisms is actuated by pivotal movement of said second bale member; and
    (e) each of said bale members includes a transverse portion conforming to the peripheral shape of the cross portion of said handle bar whereby said cross portion is received in said bale transverse portions when said bales are in their actuating positions to operatively form a unitary member with said cross portion.

2. A control assembly as recited in claim 1 wherein said connecting means for said opposite ends of said first and second bale members is formed by connecting means positioned on a medial portion of said handle bar cross portion.

3. A control assembly as recited in claim 1 wherein said pivotally connecting means is formed by an axle member extending between and attached to said opposite portions of said handle bar and said ends of said bale members are pivotally attached to said axle member.

4. A control assembly as recited in claim 1 where said one ends of said bale members each includes an abutment member for engaging said handle bar to limit the movement of said bale members.

* * * * *